United States Patent
Nocon et al.

(10) Patent No.: US 11,076,276 B1
(45) Date of Patent: Jul. 27, 2021

(54) SYSTEMS AND METHODS TO PROVIDE WIRELESS COMMUNICATION BETWEEN COMPUTING PLATFORMS AND ARTICLES

(71) Applicant: Disney Enterprises, Inc., Burbank, CA (US)

(72) Inventors: Nathan D. Nocon, Burbank, CA (US); Hunter J. Gibson, Burbank, CA (US); Michael P. Goslin, Burbank, CA (US); Tritia V. Medrano, Burbank, CA (US); Timothy M. Panec, Burbank, CA (US); Jason Yeung, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 16/818,433

(22) Filed: Mar. 13, 2020

(51) Int. Cl.
*H04W 4/80* (2018.01)
*H04W 4/38* (2018.01)
*G06F 1/16* (2006.01)

(52) U.S. Cl.
CPC .............. *H04W 4/80* (2018.02); *G06F 1/163* (2013.01); *H04W 4/38* (2018.02)

(58) Field of Classification Search
CPC ......... H04W 4/24; H04W 4/02; H04W 4/029; H04W 4/021; H04W 12/08; H04W 40/24; H04W 64/00; H04W 16/18; H04W 36/14; H04W 48/16; H04W 48/18; H04W 4/20; H04W 64/006
USPC ....................................................... 455/41.2
See application file for complete search history.

(56) References Cited

U.S. PATENT DOCUMENTS

| 1,004,331 | A | 9/1911 | Wright |
| 1,004,624 | A | 10/1911 | Brann |
| 5,299,291 | A | 3/1994 | Ruetz |
| 5,766,077 | A | 6/1998 | Hongo |
| 6,007,338 | A | 12/1999 | Dinunzio |

(Continued)

FOREIGN PATENT DOCUMENTS

| IN | 1381KOL2007 | 4/2009 |
| JP | 2019065430 | 4/2019 |

(Continued)

OTHER PUBLICATIONS

Rollycat is Always Active, Just Like your Cat, (Mar. 2016); retrieved from http://rollycat.com/.

(Continued)

*Primary Examiner* — Ajibola A Akinyemi
(74) *Attorney, Agent, or Firm* — Esplin & Associates, PC

(57) ABSTRACT

This disclosure presents systems and methods to provide wireless communication between computing platforms and wearable articles. Exemplary implementations may: obtain wireless communication signals from a first wearable article and detect presence of the first wearable article; obtain wireless communication signals from the first wearable article conveying article information identifying the first wearable article and/or a user; identify customizable attributes of one or more application programs; determine custom-defined values for the customizable attributes; effectuate the custom-defined values for the customizable attributes of one or more application programs such that the one or more application programs reflect the custom-defined values; and/or perform other operations.

20 Claims, 4 Drawing Sheets

(56) References Cited

U.S. PATENT DOCUMENTS

| | | | |
|---|---|---|---|
| 6,053,815 | A | 4/2000 | Hara |
| 6,200,138 | B1 | 3/2001 | Ando |
| 6,691,032 | B1 | 2/2004 | Irish |
| 6,705,972 | B1 | 3/2004 | Takano |
| 6,901,390 | B2 | 5/2005 | Mizokawa |
| 7,081,033 | B1 | 7/2006 | Mawle |
| 7,266,847 | B2 | 9/2007 | Pauker |
| 7,739,371 | B2 | 6/2010 | Ikegaya |
| 7,837,544 | B2 | 11/2010 | Tipping |
| 7,980,997 | B2 | 7/2011 | Thukral |
| 8,190,295 | B1 | 5/2012 | Garretson |
| 8,235,724 | B2 | 8/2012 | Gilley |
| 8,758,126 | B2 | 6/2014 | Bavitz |
| 8,831,228 | B1 | 9/2014 | Agrawal |
| 8,882,595 | B2 | 11/2014 | Chowdhary |
| 8,894,462 | B2 | 11/2014 | Leyland |
| 8,941,690 | B2 | 1/2015 | Seder |
| 8,988,465 | B2 | 3/2015 | Baron |
| 9,007,400 | B2 | 4/2015 | Takahashi |
| 9,008,310 | B2 | 4/2015 | Nelson |
| 9,266,018 | B2 | 2/2016 | Story |
| 9,293,042 | B1 | 3/2016 | Wasserman |
| 9,327,189 | B2 | 5/2016 | Bavitz |
| 9,361,730 | B2 | 6/2016 | Keating |
| 9,390,626 | B1 | 7/2016 | Horowitz |
| 9,467,515 | B1 | 10/2016 | Penilla |
| 9,610,510 | B2 | 4/2017 | Comploi |
| 9,643,086 | B2 | 5/2017 | Tipping |
| 9,669,302 | B2 | 6/2017 | Park |
| 9,674,361 | B2 | 6/2017 | Ristock |
| 9,715,764 | B2 | 7/2017 | Alaniz |
| 9,744,448 | B2 | 8/2017 | Mullen |
| 9,814,991 | B2 | 11/2017 | Van Winkle |
| 9,814,993 | B2 | 11/2017 | Ponomarev |
| 9,821,920 | B2 | 11/2017 | Cole |
| 9,922,466 | B2 | 3/2018 | Donnelly |
| 10,019,070 | B2 | 7/2018 | Szczerba |
| 10,025,431 | B2 | 7/2018 | Li |
| 10,045,147 | B2 | 8/2018 | Dickow |
| 10,059,347 | B2 | 8/2018 | Thieberger-Navon |
| 10,123,155 | B2 | 11/2018 | Grover |
| 10,140,464 | B2 | 11/2018 | Lebeck |
| 10,162,998 | B2 | 12/2018 | Park |
| 10,186,065 | B2 | 1/2019 | Anderson |
| 10,310,600 | B2 | 6/2019 | Hong |
| 10,339,711 | B2 | 7/2019 | Ng-Thow-Hing |
| 10,366,290 | B2 | 7/2019 | Wang |
| 10,376,776 | B2 | 8/2019 | Lowe |
| 10,482,669 | B2 | 11/2019 | Rober |
| 10,501,053 | B2 | 12/2019 | Tokunaga |
| 10,506,092 | B1 | 12/2019 | Stephenson |
| 10,572,123 | B2 | 2/2020 | Penilla |
| 10,585,471 | B2 | 3/2020 | Reichow |
| 10,589,625 | B1 | 3/2020 | Goslin |
| 10,639,557 | B2 | 5/2020 | Hake |
| 10,785,621 | B1 | 9/2020 | Drake |
| 10,841,632 | B2 | 11/2020 | Chao |
| 2003/0027636 | A1 | 2/2003 | Covannon |
| 2003/0104824 | A1 | 6/2003 | Hale |
| 2003/0130031 | A1 | 7/2003 | Yoshida |
| 2004/0059922 | A1 | 3/2004 | Harris |
| 2005/0021192 | A1 | 1/2005 | Takafuji |
| 2005/0059483 | A1 | 3/2005 | Borge |
| 2006/0052153 | A1 | 3/2006 | Vlazny |
| 2006/0143270 | A1 | 6/2006 | Wodtke |
| 2006/0224456 | A1 | 10/2006 | Walker |
| 2006/0277100 | A1 | 12/2006 | Parham |
| 2007/0060233 | A1 | 3/2007 | Liccardo |
| 2007/0087834 | A1 | 4/2007 | Moser |
| 2007/0093299 | A1 | 4/2007 | Bergeron |
| 2007/0139671 | A1 | 6/2007 | Stevens |
| 2007/0197275 | A1 | 8/2007 | Gagner |
| 2007/0206023 | A1 | 9/2007 | Street |
| 2008/0091782 | A1 | 4/2008 | Jakobson |
| 2008/0105751 | A1 | 5/2008 | Landau |
| 2008/0148067 | A1 | 6/2008 | Sitrick |
| 2008/0200244 | A1 | 8/2008 | Rowe |
| 2008/0309010 | A1 | 12/2008 | Bowling |
| 2008/0311983 | A1 | 12/2008 | Koempel |
| 2009/0030977 | A1 | 1/2009 | Brown |
| 2009/0069084 | A1 | 3/2009 | Reece |
| 2009/0079705 | A1 | 3/2009 | Sizelove |
| 2009/0095663 | A1 | 4/2009 | Stein |
| 2009/0137323 | A1 | 5/2009 | Fiegener |
| 2009/0176566 | A1 | 7/2009 | Kelly |
| 2009/0313358 | A1 | 12/2009 | Shepherd |
| 2010/0033427 | A1 | 2/2010 | Marks |
| 2010/0093421 | A1 | 4/2010 | Nyman |
| 2010/0098092 | A1 | 4/2010 | Luo |
| 2010/0130296 | A1 | 5/2010 | Ackley |
| 2010/0182340 | A1 | 7/2010 | Bachelder |
| 2010/0324984 | A1 | 12/2010 | Pelto |
| 2010/0331721 | A1 | 12/2010 | Epley |
| 2011/0098092 | A1 | 4/2011 | Reiche, III |
| 2011/0183754 | A1 | 7/2011 | Alghamdi |
| 2011/0216948 | A1 | 9/2011 | Yalla |
| 2012/0089275 | A1 | 4/2012 | Yao-Chang |
| 2012/0142415 | A1 | 6/2012 | Lindsay |
| 2012/0256945 | A1 | 10/2012 | Kidron |
| 2012/0264518 | A1 | 10/2012 | Rouille |
| 2012/0289122 | A1 | 11/2012 | Elliott |
| 2012/0295703 | A1 | 11/2012 | Reiche |
| 2012/0295704 | A1 | 11/2012 | Reiche |
| 2013/0030645 | A1 | 1/2013 | Divine |
| 2013/0083003 | A1 | 4/2013 | Perez |
| 2013/0083061 | A1 | 4/2013 | Mishra |
| 2013/0157607 | A1 | 6/2013 | Paek |
| 2013/0166147 | A1 | 6/2013 | Chudzinski |
| 2013/0274024 | A1 | 10/2013 | Geylik |
| 2013/0296058 | A1 | 11/2013 | Leyland |
| 2014/0067208 | A1 | 3/2014 | Klappert |
| 2014/0100020 | A1 | 4/2014 | Carroll |
| 2014/0100029 | A1 | 4/2014 | Reiche |
| 2014/0128144 | A1 | 5/2014 | Bavitz |
| 2014/0128145 | A1 | 5/2014 | Hwang |
| 2014/0162785 | A1 | 6/2014 | Reiche |
| 2014/0163771 | A1 | 6/2014 | Demeniuk |
| 2014/0189017 | A1 | 7/2014 | Prakash |
| 2014/0273717 | A1 | 9/2014 | Judkins |
| 2014/0274313 | A1 | 9/2014 | Bala |
| 2014/0295963 | A1 | 10/2014 | Ishikawa |
| 2014/0342790 | A1 | 11/2014 | Kim |
| 2015/0003609 | A1 | 1/2015 | Nelson |
| 2015/0024852 | A1 | 1/2015 | Pacey |
| 2015/0056588 | A1 | 2/2015 | Bayer |
| 2015/0065213 | A1 | 3/2015 | Dugan |
| 2015/0065237 | A1 | 3/2015 | Hohn |
| 2015/0080125 | A1 | 3/2015 | Andre |
| 2015/0097860 | A1 | 4/2015 | Alaniz |
| 2015/0097864 | A1 | 4/2015 | Alaniz |
| 2015/0100179 | A1 | 4/2015 | Alaniz |
| 2015/0145671 | A1 | 5/2015 | Cohen |
| 2015/0174479 | A1 | 6/2015 | Reiche |
| 2015/0202962 | A1 | 7/2015 | Habashima |
| 2015/0269780 | A1 | 9/2015 | Herman |
| 2015/0294505 | A1 | 10/2015 | Atsmon |
| 2015/0346722 | A1 | 12/2015 | Herz |
| 2015/0363092 | A1 | 12/2015 | Morton |
| 2016/0029962 | A1 | 2/2016 | Hyde |
| 2016/0042607 | A1 | 2/2016 | McCoy |
| 2016/0071397 | A1 | 3/2016 | Logan |
| 2016/0096114 | A1 | 4/2016 | Van Winkle |
| 2016/0189444 | A1 | 6/2016 | Madhok |
| 2016/0199730 | A1 | 7/2016 | Olson |
| 2016/0206955 | A1 | 7/2016 | Goslin |
| 2016/0206957 | A1 | 7/2016 | Goslin |
| 2016/0216854 | A1 | 7/2016 | McClellan |
| 2016/0224939 | A1 | 8/2016 | Chen |
| 2016/0299567 | A1 | 10/2016 | Crisler |
| 2016/0310839 | A1 | 10/2016 | Leyland |
| 2016/0313792 | A1 | 10/2016 | Siegel |
| 2016/0325180 | A1 | 11/2016 | Nelson |
| 2016/0346704 | A1 | 12/2016 | Wagner |
| 2017/0021273 | A1 | 1/2017 | Rios |

(56) References Cited

U.S. PATENT DOCUMENTS

| | | |
|---|---|---|
| 2017/0021282 A1 | 1/2017 | Comploi |
| 2017/0045946 A1 | 2/2017 | Smoot |
| 2017/0050743 A1 | 2/2017 | Cole |
| 2017/0068311 A1 | 3/2017 | Evans |
| 2017/0072316 A1 | 3/2017 | Finfter |
| 2017/0078621 A1 | 3/2017 | Sahay |
| 2017/0103571 A1 | 4/2017 | Beaurepaire |
| 2017/0106288 A1 | 4/2017 | Reiche |
| 2017/0132334 A1 | 5/2017 | Levinson |
| 2017/0154024 A1 | 6/2017 | Subramanya |
| 2017/0158023 A1 | 6/2017 | Stevanovic |
| 2017/0166221 A1 | 6/2017 | Osterman |
| 2017/0216675 A1 | 8/2017 | Goslin |
| 2017/0236328 A1 | 8/2017 | Eatedali |
| 2017/0253252 A1 | 9/2017 | Donnelly |
| 2017/0330034 A1 | 11/2017 | Wang |
| 2017/0344754 A1 | 11/2017 | Kumar |
| 2017/0352185 A1 | 12/2017 | Bonilla Acevedo |
| 2018/0008894 A1 | 1/2018 | Sack |
| 2018/0011988 A1* | 1/2018 | Ziegler ................ G06F 21/35 |
| 2018/0040162 A1 | 2/2018 | Donnelly |
| 2018/0040163 A1 | 2/2018 | Donnelly |
| 2018/0043272 A1 | 2/2018 | Van Winkle |
| 2018/0089900 A1 | 3/2018 | Rober |
| 2018/0089901 A1 | 3/2018 | Rober |
| 2018/0096501 A1 | 4/2018 | Anderson |
| 2018/0181412 A1 | 6/2018 | Paratey |
| 2018/0231973 A1 | 8/2018 | Mattingly |
| 2018/0247352 A1 | 8/2018 | Rogers |
| 2018/0369702 A1 | 12/2018 | Hake |
| 2019/0001987 A1 | 1/2019 | Kim |
| 2019/0014070 A1 | 1/2019 | Mertvetsov |
| 2019/0047498 A1 | 2/2019 | Alcaidinho |
| 2019/0065970 A1 | 2/2019 | Bonutti |
| 2019/0075437 A1 | 3/2019 | Shaikh |
| 2019/0101976 A1 | 4/2019 | Reichow |
| 2019/0157607 A1 | 5/2019 | Kim |
| 2019/0220674 A1 | 7/2019 | Khalfan |
| 2020/0053400 A1 | 2/2020 | Chao |
| 2020/0074181 A1 | 3/2020 | Chang |
| 2020/0151768 A1 | 5/2020 | Dekeyser |
| 2020/0163616 A1* | 5/2020 | Sakaya ................ A61B 5/0022 |
| 2020/0193163 A1 | 6/2020 | Chang |

FOREIGN PATENT DOCUMENTS

| | | |
|---|---|---|
| WO | 2007101785 A1 | 9/2007 |
| WO | 2018128946 A1 | 7/2018 |

OTHER PUBLICATIONS

Buzzfeed, *Gays Vs. Lesbians: Raising A Robot Baby* (Oct. 10, 2016); retrieved from https://www.youtube.com/watch?v=DekyZc8i7Uo.

Breazeal et al., Infant-like Social Interactions between a Robot and a Human Caretaker, Massachusetts Institute of Technology, 1998, retrieved from https://pdfs.semanticscholar.org/ddb5/2c6ed2e31ad81307a9fc9e497d7566a307a9.pdf.

Adam Hartley, 5 Predictions for the Future of in-Car Entertainment, Apr. 9, 2019 [https://360.here.com/5-predictions-for-the-future-of-in-car-leisure-entertainment], (5 pages).

Lambros Sarakis, et al., Technological Educational Institute of Sterea Ellada; Hellenic Open University; Synelixis Solutions Ltd., Providing Entertainment Applications in VANET Environments, Mar. 2, 2016 [https://ieeexplore.ieee.org/document/7422403] (8 pages).

Raman Mehta, IDG Communications, Inc., Augmented Reality—Next Frontier for Competitive Advantage, Feb. 14, 2017 [https://www.cio.com/article/3169685/augmented-reality-next-frontier-for-competitive-advantage.html], (5 pages).

Kloster, Benjamin, 'Wanted: Encryption Scheme for Copy Protection Purposes', Retrieved from the Internet http://stackoverflow.com/questions/14529732/wanted-encryption-scheme-for-copy-protection-purposes, Jan. 25, 2013, XP055152568, 2 pages.

Dagamant, 'Skylanders Hacking', Retrieved from the Internet http://web.archive.ora/web/20120309212642/http://www.suncries.com/skvlaners-hacking Feb. 27, 2012, XP055152538, 8 pages.

Extended European Search Report issued in European Patent Application No. 14175300.4, dated Nov. 19, 2014. (6 pgs).

"Sun CriesSun Cries", http://web.archive.org, Mar. 9, 2012 (Mar. 9, 2012), XP055152538, Retrieved from the Internet: URL: http://web.archive.org/web/20120309212642/http://www.suncries.com/skylanders-hacking [retrieved on Nov. 12, 2014] (8 pgs).

"Video Game/ Battle Circuit", TV Tropes, available at «https://web.archive.org/web/20150114005112/http://tvtropes.org/pmwiki/pmwiki.php/VideoGameBattleCircuit» (4 pages).

"Battle Circuit", Capcom, available at «https://web.archive.org/web/20000111073021/http://www.capcom.co.jp/newproducts/arcade/battle/bs-top.html» (Original Japanese web page followed by English translation), 4 pages.

Google search "Iphone Figurine" (Year: 2020), 1 page.

NPX "Software-Apple-Carplay: Software Technology for CarPlay", https://www.nxp.com/design/software/embedded-software/software-technology-for-carplay:Software-Apple-Carplay (Year: 2020), 3 pages.

Apple (Developing Wireless CarPlay System, https://developer.apple.com/videos/play/wwdc2017/717/WWDC 2017, video and slide). (Year: 2017).

* cited by examiner

SYSTEMS AND METHODS TO PROVIDE WIRELESS COMMUNICATION BETWEEN COMPUTING PLATFORMS AND ARTICLES

FIELD

This disclosure relates to systems and methods to provide wireless communication between computing platforms and articles.

BACKGROUND

Electronics may be used to collect data in a variety of ways. Sensors may be embedded in devices worn by users to collect data about the user, for example, fitness metrics.

SUMMARY

One aspect of the disclosure relates to a system configured to provide wireless communication between computing platforms and articles. An article may be worn, held, carried by, attached to, and/or otherwise coupled to a user. In some implementations, an article may include one or more of an article of clothing, an article of accessory, an article of gear, and/or other considerations. An article of clothing may refer to a covering designed to be worn on a person's body. An article of accessory may be categorized into one or more general areas: those that are carried, those that are worn, and/or other areas. An article of gear may include item(s) providing some functionality beyond mere covering a body and/or accessorizing. An article of gear may comprise a subset of an article of accessory, however, providing additional functionality.

Traditionally, radio-frequency identification (RFID) tags may be used for identifying and tracking objects to which the RFID tags are attached. RFID tags may include an integrated circuit and an antenna that transmit data to an RFID reader. RFID tags generally work over short distances. RFID's low-frequency (LF) implementations may operate over much longer distances (0-30 m), but unfortunately the LF subset of RFID is not integrated in mobile phones nor ideal to be integrated into phones from a power & TX antenna design standpoint. NFC, a mid-frequency subset of RFID, is a ubiquitous integrated feature in today's mobile phones, but is only operable over short distances (0-3 cm) between an NFC tag and a user's mobile phone. Therefore, there is a gap in the market for a tag designed to operate over larger distances using a different ubiquitous integrated feature in today's mobile phone.

A system configured to provide wireless communication between computing platforms and articles may include one or more of one or more computing platforms, one or more articles, and/or other components. An article may be configured to transmit and/or receive signals wirelessly. An article may be configured to only transmit, only receive, or transmit and receive signals wirelessly. By way of non-limiting illustration, an article may include one or more components configured to facilitate wireless communication via Bluetooth Low Energy (BLE) and/or other wireless communication protocols. The transmitted and/or received signals may convey information. In some implementations, one or more components of an article may be configured to be powered through energy harvesting. By way of non-limiting illustration, an individual transceiver may include an RF energy harvesting antenna. In some implementations, an article may include a self-powered wireless module (e.g., a tag, a chip, and/or other module). A self-powered wireless module may be integrated into an article that may be washed and is small of size (e.g. US quarter dollar coin). Sensors may be attached to the module to detect information about a user of an article and/or the ambient environment.

A first wearable article may include one or more of a first transceiver, a first non-transitory electronic storage, and/or other components. The first transceiver may be configured to transmit and/or receive wireless communication signals. The first non-transitory electronic storage may store article information and/or other information. The article information may identify the first wearable article and/or the user of the wearable article.

One or more physical processors of a computing platform may be configured by machine-readable instructions. Executing the machine-readable instructions may cause the one or more physical processors to facilitate wireless communication between the computing platform and one or more articles. The machine-readable instructions may include one or more computer program components. The one or more computer program components may include one or more of a communication component, a detection component, a customize component, and/or other components.

The communication component may be configured to obtain wireless communication signals from the first wearable article and/or other articles. In some implementations, the wireless communication signals may include one or more of a first set of one or more wireless communication signals, a second set of one or more wireless communication signals, and/or other wireless communication signals. The first set of one or more wireless communication signals may convey advertising information and/or other information. The advertising information may include advertising packets configured to facilitate one or more of detection of the first wearable article, identification of the first wearable article, and/or other operations. The first wearable article many send a packet on at least one of three channels, with a repetition period called the advertising interval. One or more wireless communication signals may be a request for connection after detection. The second set of one or more wireless communication signals may convey the article information and/or other information. It is noted that the descriptions of the first set, the second set, and/or other sets of one or more wireless communication signals as separate and distinct sets of signals are provided for illustrative purposes only and are not to be considered limiting. Instead, in some implementations, one or more of the advertising information, the article information, and/or other information may be combined in one or more of the initial advertising packets.

The detection component may be configured to detect presence of the first wearable article based on reception of the first set of one or more wireless communication signals, and/or other information. The detection component may be configured to determine the article information from the second set of one or more wireless communication signals.

The customize component may be configured to identify customizable attributes of one or more application programs of the computing platform.

The customize component may be configured to determine custom-defined values for the customizable attributes of the one or more application programs based on the article information and/or other information. The custom-defined values may be specific to the article information and/or other information.

The customize component may be configured to effectuate the custom-defined values for the customizable attributes of one or more application programs so that the one or more application programs may be configured to reflect the custom-defined values.

These and other objects, features, and characteristics of the system and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
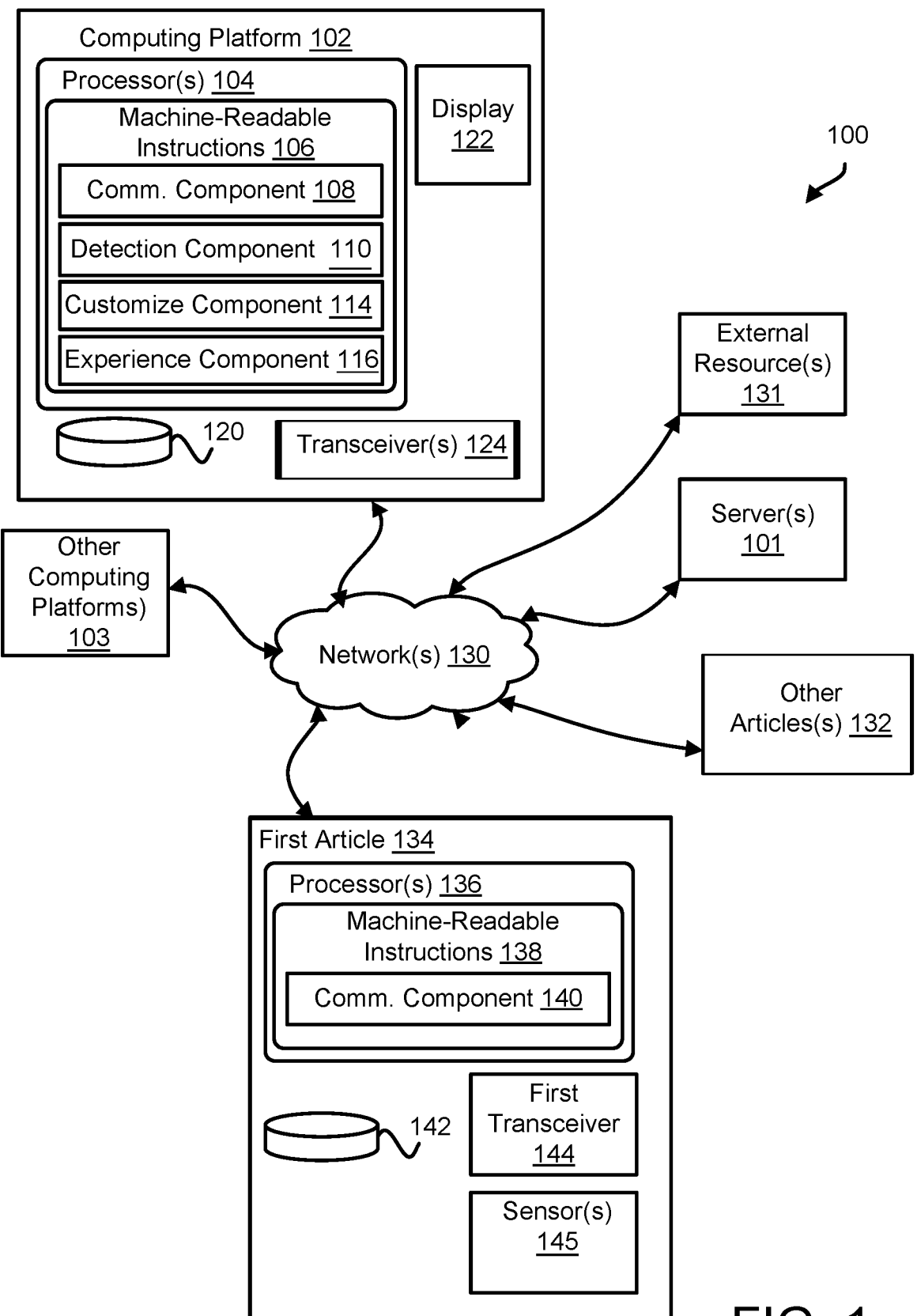
FIG. 1 illustrates a system configured to provide wireless communication between computing platforms and articles, in accordance with one or more implementations.

FIG. 1 illustrates a system 100 configured to provide wireless communication between computing platforms and articles. An article may be configured to transmit and/or receive signals wirelessly. By way of non-limiting illustration, an article may include one or more components configured to facilitate wireless communication via Bluetooth Low Energy (BLE) and/or other wireless communication protocols. The transmitted and/or received signals may convey information. The conveyance of information between a computing platform and/or to other articles may enhance user interaction with the articles and/or drive new and interesting experiences.

In some implementations, one or more components of an article may be configured to be powered through energy harvesting. By way of non-limiting illustration, an individual transceiver may include wireless energy harvesting. The harvesting antenna(s) may be combined-with and/or in-addition-to the RF communication front end. In some implementations, the wireless harvesting and communication circuitry could be combined to function as a self-powered wireless module. The self-power wireless module could be designed and integrated into an article that may be washed and be of a small size (e.g. quarter dollar coin). Sensors and/or limited computing may be integrated into the self-powered wireless module for additional functionality.

The system 100 may include one or more of a computing platform 102, one or more other computing platforms 103 (e.g., a second computing platform, a third computing platform, . . . nth computing platform), a first article 134, one or more other articles 132, one or more external resources 131, one or more servers 101, and/or other components.

While some descriptions herein may be directed to features and/or functions of computing platform 102, it is to be noted that other ones of one or more other computing platforms 103 may be configured similarly as computing platform 102. Further, while some descriptions herein may be directed to features and/or functions of first article 134, it is to be noted that other ones of one or more other articles 132 may be configured similarly as first article 134.

The first article 134 may be configured to be coupled to a user (not shown) of system 100. By way of non-limiting illustration, the first article 134 may be worn, held, carried by, attached to, and/or otherwise coupled to a user. In some implementations, first article 134 may include one or more of an article of clothing, an article of accessory, an article of gear, and/or other considerations. An article of clothing may refer to a covering designed to be worn on a person's body. An article of clothing may include one or more of a shirt, a blouse, pants, dress, and/or other clothing. An article of accessory may be categorized into one or more general areas: those that are carried, those that are worn, and/or other areas. An article of accessory may be different from an article of clothing. A carried article of accessory may include one or more of purses, handbags, eyewear, hand fans, parasols, wallets, and/or other articles. A worn article of accessory may include one or more of jackets, boots, shoes, cravats, ties, hats, bonnets, belts, suspenders, gloves, muffs, jewelry, watches, sashes, shawls, scarves, socks, stockings, and/or other articles. An article of gear may include item(s) providing some functionality (e.g., a utility) beyond covering a portion of a body. An article of gear may comprise a subset of an article of accessory, however, providing additional utility. An article of gear may include one or more of a backpack, a fanny pack, a utility belt, umbrellas, canes, and/or other gear.

The first article 134 may include one or more of a first set of one or more processors 136, first non-transitory electronic storage 142, a first transceiver 144, one or more sensors 145, a battery (not shown), and/or other components. The first non-transitory electronic storage 142 may be configured to store article information, advertising information, and/or other information.

The article information may specify one or more of an identity of a user, an identity of the first article 134, and/or other information. The identity of the user may be specified by one or more of a name, a username, a handle, a serial number, and/or other information. The identity of the first article 134 may be specified by one or more of a characterization of the first article 134 (e.g., a t-shirt), a characterization of content portrayed on the first article 134, a unique serial number, a stock keeping unit (SKU), and/or other information. Characterization of portrayed content may include one or more of a unit identification of the content, a brand, and/or other information. A unique identification may include a name and/or other information. Brand may refer to a network of intellectual property with which the product may be associated with. By way of non-limiting illustration, brand may refer to one or more of a proprietary franchise, a type of product manufactured by a particular company under a particular name, and/or other information. A proprietary franchise may include one or more of a movie franchise, a game franchise, a marketing franchise, a clothing franchise, and/or other proprietary franchise. By way of non-limiting illustration, a unique identification may include a name of a movie character, while a brand may include the movie franchise.

In some implementations, the article information may be stored to the first non-transitory electronic storage 142 prior to purchase, at the time of purchase, and/or after purchase. By way of non-limiting illustration, a manufacturer may store article information identifying an article at the time of manufacture. By way of non-limiting illustration, a writer at a point of purchase computing platform may write the article information to the first non-transitory electronic storage 142. In some implementations, after purchase, a user may wirelessly connect to first article 134 via computing platform 102, enter and/or select article information into a user interface (not shown in FIG. 1), and communicate the article information to the first article 134 for storage in first non-transitory electronic storage 142.

The advertising information may include advertising packets configured to facilitate detection of the first article 134. The first article 134 many send a packet on at least one of three channels, with a repetition period called the advertising interval.

The first transceiver 144 may be configured to transmit and/or receive signals wirelessly. By way of non-limiting illustration, the first transceiver 144 may be configured to wireless communicate via Bluetooth Low Energy (BLE) and/or other wireless communication protocols. The transmitted and/or received signals may convey information. In some implementations, one or more components of first article 134 may be configured to be powered through energy harvested from one or more transceivers 144. By way of non-limiting illustration, an individual transceiver may include an RF energy harvesting antenna. In some implementations, the first transceiver 144 and/or other components of first article 134 may be provided into a self-powered wireless module.

The first set of one or more processors 136 may be configured to provide information-processing capabilities in first article 134. As such, in some implementations, the first set of one or more processors 136 may include one or more of a digital processor, an analog processor, a digital circuit designed to process information, an analog circuit designed to process information, a state machine, and/or other mechanisms for electronically processing information. In some implementations, the first set of one or more processors 136 may be provided as part of an integrated circuit of a self-powered wireless module.

The first set of one or more processors 136 may be configured by machine-readable instructions 138. Executing the machine-readable instructions 138 may cause the first set of one or more processors 136 to facilitate communication to and/or from first article 134. The machine-readable instructions 138 may include one or more computer program components. The one or more computer program components may include a communication component 140 (abbreviated "Comm. Component 140" in FIG. 1) and/or other components.

The communication component 140 may be configured to generate wireless communication signals. The signals may convey information, such as the article information, advertising information, and/or other information. The communication component 140 may be configured to effectuate transmission of signals via first transceiver 144.

The communication component 140 may be configured to obtain signals communicated from one or more of computing platform 102, one or more other computing platforms 103, one or more other articles 132, and/or other entities. The communication component 140 may be configured to derive information carried by the obtained signals.

The first article 134 may include one or more sensors 145. The one or more sensors 145 may be included in, or coupled to, a self-powered wireless module. The one or more sensors 145 may include one or more of an orientation sensor, a motion sensor, a temperature sensor, a moisture sensor, a light sensor, a pressure sensor, heart rate sensor, and/or other sensors. The one or more sensors 145 may be configured to generate output signals conveying sensor information and/or other information.

An orientation sensor may be configured to generate output signals conveying sensor information comprising orientation information and/or other information. Orientation information derived from output signals of an orientation sensor may define an orientation of computing platform 102. In some implementations, orientation of computing platform 102 may refer to one or more of a pitch angle, a roll angle, a yaw angle, a heading, a pointing direction, a bearing, and/or other measurements. An orientation sensor may include an inertial measurement unit (IMU) such as one or more of an accelerometer, a gyroscope, a magnetometer, inclinometers, and/or other devices.

In some implementations, a motion sensor may be configured to generate output signals conveying sensor information comprising motion information and/or other information. Motion information derived from output signals of a motion sensor may including detection of moving objects at and/or near the motion senor, and/or other measurements. A motion sensor may include one or more of an optical, a microwave, and/or an acoustic sensor.

A temperature sensor may be configured to generate output signals conveying sensor information comprising temperature information and/or other information. Temperature information derived from output signals of a temperature sensor may define one or more of a temperature at the temperature sensor, temperature within a threshold range of the temperature sensor, and/or other measures of temperature. A temperature sensor may include one or more of a thermocouple, a resistive temperature measuring devices, an infrared sensor, a bimetallic device, a thermometer, and/or other temperature sensors.

A light sensor may be configured to generate output signals conveying sensor information comprising ambient light information and/or other information. The ambient light information derived from output signals of a light sensor may define intensity and/or presence (or absence) of light or other electromagnetic radiation incident on the light sensor. A light sensor may include one or more of a photodiode, an active-pixel sensor, photovoltaic, and/or other sensors.

A pressure sensor may be configured to generate output signals conveying sensor information comprising pressure information and/or other information. Pressure information derived from output signals of a pressure sensor may define a force per unit area imparted to the pressure sensor. A pressure sensor may include one or more of a piezo resistive strain gauge, a capacitive pressure sensor, an electromagnetic pressure sensor, a piezoelectric sensor, a strain-gauge, and/or other pressure sensors.

A moisture sensor may be configured to generate output signals conveying sensor information comprising moisture information and/or other information. Moisture information derived from output signals of a moisture sensor may specify an absence or presence of moisture, a moisture level, a moisture content, and/or other information.

A heart rate sensor may be configured to generate output signals conveying sensor information comprising heart rate information and/or other information. Heart rate information derived from output signals of a heart rate sensor may specify absence or presence of a heartbeat, a rate of heartbeat, and/or other information.

The communication component 140 may be configured to obtain output signals generated by one or more sensors 145. The communication component 140 may be configured to derive information conveyed by the output signals.

The computing platform 102 may include one or more of one or more physical processors 104, non-transitory electronic storage 120, a display 122, one or more transceivers 124, and/or other components.

The one or more transceivers 124 may be configured for wireless communication. The wireless communication may include Bluetooth Low Energy (BLE) and/or other wireless communication protocol. The one or more transceivers 124 may be configured to transmit and/or receive radio-frequency (RF) signals. The transmitted and/or received signals may convey information.

The one or more physical processors 104 may be configured to provide information-processing capabilities in computing platform 102. As such, in some implementations, processor(s) 104 may include one or more of a digital processor, an analog processor, a digital circuit designed to process information, an analog circuit designed to process information, a state machine, and/or other mechanisms for electronically processing information.

In some implementations, one or more physical processors 104 may be configured to provide remote hosting of features and/or functions of machine-readable instructions 106 to computing platform 102. In some implementations, one or more physical processors 104 may be remotely located from computing platform 102. The one or more physical processors 104 may communicate with computing platform 102, via client/server architecture, and/or other communication schemes. By way of non-limiting illustration, one or more physical processors 104 may comprise one or more computing platforms. In some implementations, one or more physical processors 104 may comprise processor(s) within one or more servers 101. As such features and/or functions of one or more physical processors 104 may be attributed to one or more servers 101 and served to computing platform 102 and/or other computing platforms via client/server architecture.

In some implementations, one or more physical processors 104 may be configured to provide local hosting of features and/or functions of machine-readable instructions 106 to computing platform 102. In some implementations, one or more physical processors 104 may be included with and/or coupled to computing platform 102. The one or more physical processors 104 may communicate with computing platform 102 via local wired and/or wireless connections (e.g., USB, BLE and/or other connections), and/or other communication schemes.

In some implementations, one or more physical processors 104 may be removably coupled to computing platform 102. By way of non-limiting illustration, one or more physical processors 104 may be included in a mobile computing platform (not shown in FIG. 1). The mobile computing platform may include one or more of a cellular telephone, a smartphone, a laptop, a tablet computer, an AR/VR platform, and/or other computing platform. The mobile computing platform may be removably attachable to computing platform 102.

In some implementations, computing platform 102 may itself comprise a mobile computing platform. The mobile computing platform may include one or more of a cellular telephone, a smartphone, a laptop, a tablet computer, and/or other computing platform.

The display 122 may include one or more of a screen, a set of screens, a touchscreen, a monitor, and/or other displays.

The one or more physical processors 104 may be configured by machine-readable instructions 106. Executing machine-readable instructions 106 may cause one or more physical processors 104 to facilitate providing an interactive environment in response to touch-based inputs. The machine-readable instructions 106 may include one or more computer program components. The one or more computer program components may include one or more of a communication component 108 (abbreviated "Comm. Component 108" in FIG. 1), a detection component 110, a customize component 114, an experience component 116, and/or other components.

The communication component 108 may be configured to facilitate information communication to and/or from computing platform 102. By way of non-limiting illustration, communication component 108 may facilitate communication with one or more of first article 134, one or more other articles 132, one or more other computing platforms 103, one or more servers 101, and/or other components and/or entities included in system 100.

The communication component 108 may be configured to facilitate transmission and/or reception of signals wirelessly via transceivers(s) 124. By way of non-limiting illustration, the transceivers(s) 124 may be configured to wireless communicate via Bluetooth Low Energy (BLE) and/or other wireless communication protocols. The transmitted and/or received signals may convey information. In some implementations, transceivers(s) 124 and/or other components of computing platform 102 may be provided in a wireless module, wireless reader, and/or other devices.

The detection component 110 may be configured to perform one or more of detecting presence of individual articles, identify individual articles and/or users of the individual article, and/or other operations.

Detection component 110 may detect the presence of individual articles based on advertising information conveyed by wireless communication signals communicated from individual articles. By way of non-limiting illustration, communication component 108 may be configured to receive a first set of one or more wireless communication signals from the first article 134. The first set one or more wireless communication signals may convey advertising information and/or other information. The detection component 110 may be configured to detect presence of the first article 134 based on the advertising information and/or other information.

Detection component 110 may identify individual articles and/or individual users of articles based on article information conveyed by wireless communication signals communicated from individual articles. By way of non-limiting illustration, communication component 108 may be configured to obtain a second set of one or more wireless communication signals from the first article 134. The second set of one or more wireless communication signals may convey the article information of the first article 134. The detection component 110 may be configured to derive the article information and/or other information from the second set of one or more wireless communication signals.

Detection component 110 may determine sensor information conveyed by output signals generated from sensor(s) 145 based on wireless communication signals communicated from individual articles. By way of non-limiting illustration, communication component 108 may be configured to obtain a third set of one or more wireless communication signals from the first article 134. The third set of one or more wireless communication signals may convey output signals generated by sensor(s) 145. The detection component 110 may be configured to derive the sensor information.

It is noted that the descriptions of the first set, the second set, the third set, and/or other sets of one or more wireless communication signals as separate and distinct sets of signals are provided for illustrative purposes only and are not to be considered limiting. Instead, in some implementations, one or more of the advertising information, the article information, the sensor information, and/or other information may be combined in one or more advertising packets. One or more wireless communication signals may be a request for connection after detection if additional communication between a computing platform and article is required.

In some implementations, the operations of communication component 108 may be performed simultaneously with the operations of detection component 110. By way of non-limiting illustration, the detection of presence of an interaction entity via image information may occur simultaneously as the advertising information is sent. In some implementations, the operations of detection component 110 may be performed after, and/or responsive to, the operations of communication component 108.

The customize component 114 may be configured to identify customizable attributes of one or more application programs of the computing platform 102. In some implementations, the one or more application programs may include one or more of a display application, a messaging application, a gaming application, and/or other applications.

A display application running in computing platform 102 may dictate one or more display configurations of computing platform 102. The display configurations may include one or more of arrangement of icons, background image, color scheme, and/or other configurations. In some implementations, individual display configuration may be associated with individual customizable attributes. By way of non-limiting illustration, customizable attributes of a display application may include one or more of an icon arrangement attribute, a background image attribute, a color scheme attribute, and/or other attributes. A value of an icon arrangement attribute may specify an arrangement of icons in a display space. A value of a background image attribute may specify a graphic and/or image which is to be the background image in a display space. A value of a color scheme attribute may specify one or more colors which may dictate a color scheme of a display space of the computing platform 102.

A messaging application may facilitate communication of messages (e.g., text, image, video, GIF, voice, etc.) to and/or from computing platform 102. The messaging application may include one or more of SMS, instant messaging, email, and/or other messaging applications. In some implementations, a messaging application may include an input field that is native to a messaging space of the messaging application. The input field may include, for example, a keyboard. In some implementations, a keyboard may facilitate the input of one or more of alphanumeric characters, emojis, GIFS, images, videos, and/or other content. In some implementations, a customizable attribute of a messaging application may include a keyboard attribute for a keyboard of the messaging application and/or other attributes. The value of the keyboard attribute may dictate a configuration of the keyboard.

A gaming application may facilitate gameplay within one or more game spaces. An instance of a game space may comprise a simulated space that is accessible by one or more users via the one or more computing platforms that presents the views of the game space. The simulated space may have a topography, express ongoing real-time interaction by one or more users, and/or include one or more objects positioned within the topography that are capable of locomotion within the topography. In some instances, the topography may be a 2-dimensional topography. In other instances, the topography may be a 3-dimensional topography. The topography may include dimensions of the space and/or surface features of a surface or objects that are "native" to the space. In some instances, the topography may describe a surface (e.g., a ground surface) that runs through at least a substantial portion of the space (e.g., comprising at least part of a virtual terrain). In some instances, the topography may describe a volume with one or more bodies positioned therein (e.g., a simulation of gravity-deprived space with one or more celestial bodies positioned therein). An instance executed by the computer components may be synchronous, asynchronous, and/or semi-synchronous.

The above description of the manner in which state of the game space is determined is not intended to be limiting. A game application may be configured to express the game space in a more limited, or richer, manner. For example, views determined for the game space representing the state of the instance of the game space may be selected from a limited set of graphics depicting an event in a given place within the virtual space. The views may include additional content (e.g., text, audio, pre-stored video content, and/or other content) that describes particulars of the current state of the place, beyond the relatively generic graphics. For example, a view may include a generic battle graphic with a textual description of the opponents to be confronted. Other expressions of individual places within the game space are contemplated.

Within the instance(s) of the game space, one or more users may control game entities, groups of game entities, simulated physical phenomena (e.g., wind, rain, earthquakes, and/or other phenomena), and/or other elements within the virtual space to interact with the game space and/or other users. The game entities may include virtual characters, such as avatars, group entities, and/or other considerations. A given game entity may be controlled by a user with which it is associated. The user-controlled element(s) may move through and interact with the game space (e.g., non-user characters in the game space, other objects in the game space). The user-controlled elements controlled by and/or associated with one or more users may be created and/or customized by the one or more users, based on information received by a given client computing platform, and/or may be based on other information. One or more users may have an "inventory" of virtual items, game entities, and/or currency that the one or more users can use (e.g., by manipulation of a virtual character or other user-controlled element, and/or other items) within the game space.

A user may participate in the instance of the game space by controlling one or more of the available user-controlled game entities in the game space. Control may be exercised through control inputs such as entry, selection, and/or commands input by the one or more users. Other users of the game space may interact with the one or more users through communications exchanged within the game space. Such communications may include one or more of textual chat, instant messages, private messages, voice communications, and/or other communications. Communications may be received and entered by the users via their respective computing platforms. Communications may be routed to and from the appropriate users through network(s) 130 and/or through communications which are external to the system 100 (e.g., text messaging services associated with the users).

The instance of the game space may be persistent. That is, the game space may continue on whether or not individual players are currently logged in and/or participating in the game. A user that logs out of the game space and then logs back in some time later may find the game space has been changed through the interactions of other players with the game space during the time the player was logged out. These changes may include changes to the simulated physical space, changes in the user's inventory, changes in other user's inventories, changes experienced by non-player characters, changes to the virtual items available for use in the game, and/or other changes.

In some implementations, individual virtual objects may be configured to experience locomotion. The virtual objects may have one or more visual depictions. By way of non-limiting illustration, a virtual object may depict one or more of a real-world entity (e.g., humans and/or animals), a fantastical entity (e.g., one or more of monsters, aliens, animated movie/TV characters, and/or other entities), a real-world object (e.g., furniture, food), a shape (e.g., a star-shape), and/or other entities and/or objects.

In some implementations, customizable attributes of a game application may include one or more of a topography attribute, an avatar attribute, simulated physical phenomena attribute, inventory attribute, and/or other attributes. A value of a topography attribute may define a topography of a game space. A value of an avatar attribute may define an avatar used by a user within a game space. A value of a simulated physical phenomena attribute may define simulated physical phenomena within a game space. (e.g., wind, rain, earthquakes, and/or other phenomena). A value of an inventory attribute may define one or more of the virtual items, the game entities, and/or the currency that the one or more users can use (e.g., by manipulation of a virtual character or other user-controlled element, and/or other items) within the game space. Other aspects of a game space may be defined by values of other attributes.

The customize component 114 may be configured to determine custom-defined values for customizable attributes of one or more application programs. The custom-defined values may be determined based on one or more of article information, sensor information, and/or other information. The custom-defined values may be specific to one or more of the article information, the sensor information, and/or other information.

In some implementations, one or more of custom-defined values may be specific to an identity of an article and/or user (and/or other information included in the article information). Custom-defined values may be specific to an identity of an article and/or user by virtue of the values being representative of identity of the article and/or user. In some implementations, the custom-defined values may be representative of the identity of an article and/or user based on the article and/or user including one or both of visual depictions of appearance(s) of the identity of the article and/or user and/or audio characteristics associated with identity of an article and/or user. By way of non-limiting illustration, an article may comprise a backpack depicting a character from a movie franchise. One or more custom-defined values may define a background image attribute of a display application so that the display application causes a computing platform to include an image of the movie franchise poster as the background image. Alternatively, and/or additionally, one or more custom-defined values may define a keyboard attribute of a messaging application so that the keyboard includes a set of emojis depicting characters and/or other content from the movie franchise. By way of non-limiting illustration, an article may comprise a t-shirt depicting a fantastical character that has a distinct voice. One or more of custom-defined values may define one or more customizable attributes of an application program so that the application program includes a sound library that facilitates reproduction of the distinct voice, and/or other content.

In some implementations, one or more of custom-defined values may be specific to output signals of one or more sensors 145. Custom-defined values may be specific to output signals of one or more sensors 145 by virtue of the values being representative of output signals of one or more sensors 145 and/or responsive to the output signals of one or more sensors 145. In some implementations, the custom-defined values may be representative of the output signals of one or more sensors 145 based on the article and/or user including one or both of visual depictions of appearance(s) of the output signals of one or more sensors 145 and/or audio characteristics associated with the output signals of one or more sensors 145. By way of non-limiting illustration, an article may comprise a t-shirt. A temperature sensor coupled to the article may generate output signals conveying an increase in user temperature (e.g., the user is working out). One or more of custom-defined values may define one or more customizable attributes of an application program so that the application program is representative of the temperature increase (e.g., a color scheme is changed to red to convey heat). One or more of custom-defined values may define one or more customizable attributes of an application program so that the application program is responsive to the temperature increase (e.g., send a message to drink water, tell the user they are doing a great job, etc.).

In some implementations, the custom-defined values may be specific to combinations of information associated with articles. By way of non-limiting illustration, multiple articles may be detected at once. In some implementations, one or more of custom-defined values may be specific to identifies of multiple articles and/or multiple users. Custom-defined values may be specific to multiple articles and/or multiple users by virtue of the values being representative of identities of multiple articles and/or multiple users. In some implementations, custom-defined values specific to multiple articles and/or multiple users may be different from custom-defined values specific to individual ones of the articles and/or individual ones of the users if they were detected individually.

By way of non-limiting illustration, the one or more other articles 132 may include a second article. The second article may include one or more of a second transceiver, a second non-transitory electronic storage, and/or other components. The second transceiver may be configured to transmit and/or receive second wireless communication signals. The second non-transitory electronic storage may store second article information, and/or other information. The second article information may identify the second article. The communication component 108 may be configured to obtain a third set of one or more wireless communication signals and a fourth set of one or more wireless communication signals from the second article. The fourth set of one or more wireless communication signals may convey the second article information. The detection component 110 may be configured to detect presence of the second article based on the third set of one or more wireless communication signals and/or other information. The customize component 114 may be configured to determine one or more of the custom-defined values for the customizable attributes of the one or more application programs based on a combination of the article information (of the first article 134) the second article information such that the one or more of the custom-defined values may be specific to the article information and the second article information.

The customize component 114 may be configured to effectuate custom-defined values for customizable attributes of one or more application programs so that the one or more application programs reflect the custom-defined values.

The experience component 116 may be configured to enhance user interaction with the articles and/or drive new and interesting experiences with the articles.

In some implementations, experience component 116 may be configured to generate inventory information and/or other information. The inventory information may include an inventory of articles of a given user and/or a group of users. In some implementations, an inventory may reflect the articles which a user owns. The inventory information may include one or more of article information identifying the individual articles, usage information, location information, and/or other information.

The usage information may convey one or more of counts of instances of use of the articles by a user, sensor output signals from one or more sensors at a certain point in time and/or over a period of time, and/or other information. In some implementations, use of an article may be determined based on continued detection of an article by computing platform 102. By way of non-limiting illustration, if an article is detected within range of computing platform 102 over a threshold period of time, it may be determined that the user is currently wearing/using the article. The threshold period of time may include, for example, ten minutes and/or other time. In some implementations, use of an article may be determined based on tracking nonuse of the article. Nonuse of an article may be determined based on a lapse in time (e.g., 1 week and/or other time period) between detections of the article. By way of non-limiting illustration, an article may be detected when initially purchased, but a lapse in time with no additional detections may convey nonuse (e.g., the article has been put in storage).

The location information may include location of individual articles at time of detection. In some implementations, the location information may be determined by computing platform 102 at the time of detection. By way of non-limiting illustration, computing platform 102 may time stamp the detection of individual articles and determine location of the computing platform 102 at the time (e.g., via integrated GPS and/or other location sensor of the computing platform 102). Usage information may convey other information.

In some implementations, experience component 116 may be configured to generate recommendations based on inventory information, location information, and/or other information. The recommendations may include recommendations to use one or more articles and/or not use one or more articles. In some implementations, a recommendation to use an article may be based on the article having relatively more use associated with it (e.g., it is a "favorite" item of the user). In some implementations, a recommendation to use an article may be based on the article having relatively little use associated with it (e.g., the user may have forgot about it and/or does not use it often, so the recommendation may trigger use). In some implementations, a recommendation may include a recommendation to use multiple articles in combination. By way of non-limiting illustration, a recommendation may be for a wardrobe including multiple different articles. In some implementations, the multiple articles may be determined to achieve a certain fashion style. In some implementations, recommendations may include recommendations to purchase one or more additional articles related to one or more articles associated with relatively more use.

In some implementations, experience component 116 may be configured to determine worn times information based on usage information, location information, and/or other information. In some implementations, the worn times information may include indications of when an article is worn via close proximity detection with a user's active mobile device over some window of time and/or locations, other sensor output from other sensors, and/or other information. In some implementations, the worn times information may be determined via washed times information that may include indications of when an article is washed via temperature triggers during washing and/or drying cycles, other sensor output from other sensors, and/or other information. In some implementations, experience component 116 may be configured to provide worn-based experiences based on the number of times a user wears an article. A worn-based experience may include rewarding the wearer with digital discounts, points, coupons for additional article purchases, and/or other experience. In some implementations, the worn-based experience levels up a digital object and/or fandom counter to unlock new earned digital items and/or rewards to the wearer. In some implementations, recommendations may include recommendations to adjust wash and/or dry temperatures warmer or cooler, stagger washing cycles to prolong life of the article, and/or other recommendations related to washing.

In some implementations, experience component 116 may be configured to effectuate presentation of a user interface on computing platform 102 configured to display one or more of the inventory information, one or more recommendations, and/or other content.

In some implementations, experience component 116 may be configured to provide location-based experiences based on location information and/or other information. A location based experience may include a provision of a digital reward. In some implementations, a digital reward may be provided to a user using one or more articles at a given location. In some implementations, one or more digital rewards may be given to a group of users based on the group of users being at a same or similar location. A digital reward may include one or more of a coupon, a discount, a game reward (e.g., power up a character), and/or other reward. In some implementations, a value of the digital reward may be proportional to the quantity of users in the group.

In some implementations, the experience component 116 may be configured to provide a shopping experience based on articles within range of computing platform 102. By way of non-limiting illustration, experience component 116 may be configured to effectuate presentation of a user interface displaying article information and/or other information for a set of articles detected within range of computing platform 102. In some implementations, the user interface may display one or more of article information, pricing, and/or provide one or more features and/or functionality to complete the purchase (e.g., direct the user to an online store).

In some implementations, the experience component 116 may be configured to determine user activity of users of the articles based on sensor information and/or other information. In some implementations, user activity may include one or more of movement, orientation, and/or other information. Movement may include one or more of falling, running, walking, sitting, standing, bouncing, and/or other movement. In some implementations, orientation of a user may refer to one or more of a pitch angle, a roll angle, a yaw angle, a heading, a pointing direction, a bearing, and/or other measurements. In some implementations, the experience component 116 may be configured to determine a user is laying down, the user is laying down on their back, the user is lying down on their front, and/or other characteristics of a user. In the context of a user being an infant, the experience component 116 may be configured to determine the user is lying down on their front (e.g., face down). The experience component 116 may be configured to generate an alert.

Figure 3:
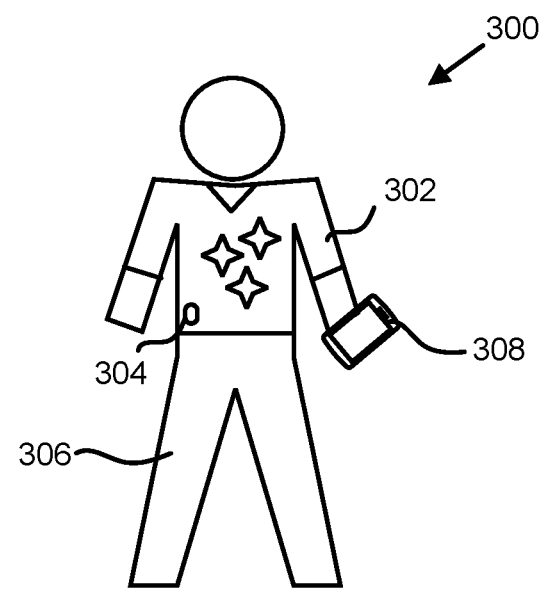
FIG. 3 shows a graphic illustration of an implementation of the system of FIG. 1.

FIG. 3 shows a graphic illustration of an implementation of a system 300 the same as or similar to system 100 of FIG. 1. The system 300 may be configured to provide wireless communication between a computing platform 308 and a wearable article 302. The wearable article 302 may be coupled to a user 306. The wearable article may include a self-powered wireless module 304. The self-powered wireless module 304 may include one or more of a first transceiver, a first non-transitory electronic storage, and/or other components. The first transceiver may be configured to transmit and/or receive wireless communication signals. The first non-transitory electronic storage may store article information and/or other information. The article information may identify the wearable article 302 and/or the user 306. By way of non-limiting illustration, the article information may identify the wearable article 302 as a shirt containing a star pattern. The computing platform 308 may include one or more physical processors configured by machine-readable instructions, and/or other components. The computing platform 308 may be configured to obtain a first set of one or more wireless communication signals from the wearable article 302 and detect presence of the wearable article 302 based on the first set of one or more wireless communication signals. The computing platform 308 may be configured to obtain a second set of one or more wireless communication signals from the wearable article 302. The second set of one or more wireless communication signals may convey the article information and/or other information. The computing platform 308 may be configured to identify customizable attributes of one or more application programs running in the computing platform 308. The computing platform 308 may be configured to determine custom-defined values for the customizable attributes of the one or more application programs based on the article information and/or other information such that the custom-defined values are specific to the article information and/or other information. The computing platform 308 may be configured to effectuate the custom-defined values for the customizable attributes of one or more application programs such that the one or more application programs reflect the custom-defined values.

Figure 4:
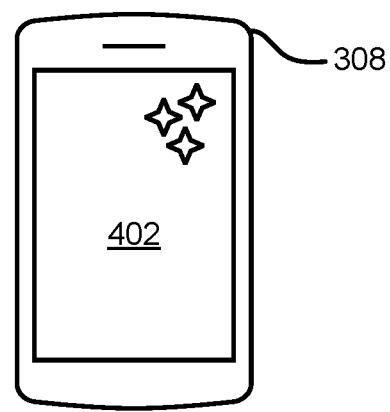
FIG. 4 shows a graphic illustration of an implementation of the system of FIG. 1.

FIG. 4 shows the computing platform 308 of FIG. 3 depicting an application program reflecting one or more custom-defined values specific to the article information. By way of non-limiting illustration, an application program may be a display application. A customizable attribute may be background image attribute of the display application. The background image attribute may be specified by a custom-defined value specific to the identity of the wearable article 302. By way of non-limiting illustration, the custom-defined value may specify a background image 402 depicting a similar graphic (e.g., star pattern) as the wearable article 302.

Figure 5:
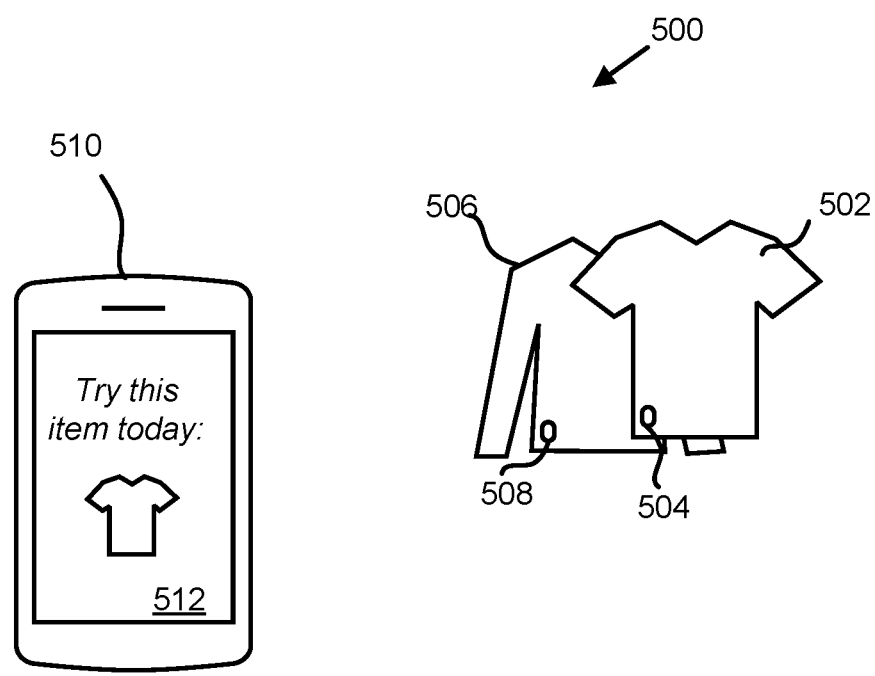
FIG. 5 shows a graphic illustration of an implementation of the system of FIG. 1.

FIG. 5 shows a graphic illustration of an implementation of a system 500 the same as or similar to system 100 of FIG. 1. The system 500 may be configured to provide wireless communication between a computing platform 308 and a set of articles. The set of articles may include one or more of a first wearable article 502, a second wearable article 506, and/or other articles. The first wearable article 502 may include a self-powered wireless module 504. The self-powered wireless module 504 may include one or more of a first transceiver, a first non-transitory electronic storage, and/or other components. The first transceiver may be configured to transmit and/or receive wireless communication signals. The first non-transitory electronic storage may store first article information and/or other information. The first article information may identify the first wearable article 502 and/or a user. The second wearable article 506 may include a self-powered wireless module 508. The self-powered wireless module 508 may include one or more of a second transceiver, a second non-transitory electronic storage, and/or other components. The second transceiver may be configured to transmit and/or receive wireless communication signals. The second non-transitory electronic storage may store second article information and/or other information. The second article information may identify the second wearable article 502 and/or a user. The computing platform 510 may include one or more physical processors configured by machine-readable instructions, and/or other components. The computing platform 510 may be configured to generate inventory information and/or other information. The inventory information may include an inventory of articles. In some implementations, an inventory may reflect the articles which a user owns. The inventory information may include one or more of the first and/or second article information identifying, usage information, location information, and/or other information.

In some implementations, computing platform 510 may be configured to generate recommendations based on inventory information, location information, and/or other information. The recommendations may include recommendations to use one or more articles and/or not use one or more articles. By way of non-limiting illustration, the computing platform 510 may be configured to effectuate presentation of a user interface 512 including a recommendation to use the first article 502.

Returning to FIG. 1, external resource(s) 131 may include sources of information, hosts, and/or providers of information outside of system 100, external entities participating with system 100, and/or other resources. In some implementations, some or all of the functionality attributed herein to external resource(s) 131 may be provided by resources included in system 100.

Individual computing platforms may include communication lines or ports to enable the exchange of information with one or more networks 130. The one or more networks 130 may include wired and/or wireless connections. By way of non-limiting illustration, one or more networks 130 may include one or more of the Internet, wireless Bluetooth Low Energy (BLE), Wi-Fi, wired Universal Serial Bus (USB) connection, wired Ethernet, and/or other connections. It will be appreciated that this is not intended to be limiting and that the scope of this disclosure includes implementations in which components of system 100 may be operatively linked via some other communication media.

Illustration of the computing platform 102 in FIG. 1 is not intended to be limiting. The computing platform 102 may include a plurality of hardware, software, and/or firmware components operating together to provide the functionality attributed herein to the computing platforms. For example, computing platform 102 may be implemented by a cloud of computing platforms operating together.

Electronic storage 120 of computing platform 102 may include electronic storage media that electronically stores information. The electronic storage media of electronic storage 120 may include one or both of system storage that is provided integrally (i.e., substantially non-removable) with computing platform 102 and/or removable storage that is removably connectable to computing platform 102 via, for example, a port or a drive. A port may include a USB port, a firewire port, and/or other port. A drive may include a disk drive and/or other drive. Electronic storage 120 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storage 120 may include one or more virtual storage resources (e.g., cloud storage, a virtual private network, and/or other virtual storage resources). Electronic storage 120 may store software algorithms, information determined by processor(s) 104, information received from external resource(s) 131, and/or other information that enables system 100 to function as described herein.

Although processor(s) 104 is shown in FIG. 1 as a single entity, this is for illustrative purposes only. In some implementations, processor(s) 104 may include one or more processing units. These processing units may be physically located within the same device, or processor(s) 104 may represent processing functionality of a plurality of devices operating in coordination. The processor(s) 104 may be configured to execute components 108, 110, 114, and/or 116. Processor(s) 104 may be configured to execute components 108, 110, 114, and/or 116 by software; hardware; firmware; some combination of software, hardware, and/or firmware; and/or other mechanisms for configuring processing capabilities on processor(s) 104.

It should be appreciated that although components 108, 110, 114, and/or 116 are illustrated in FIG. 1 as being co-located within a single processing unit, in implementations in which processor(s) 104 includes multiple processing units, one or more of components 108, 110, 114, and/or 116 may be located remotely from the other components. While computer program components are described herein as being implemented via processor(s) 104 through machine readable instructions 106, this is merely for ease of reference and is not meant to be limiting. In some implementations, one or more functions of computer program components described herein may be implemented via hardware (e.g., dedicated chip, field-programmable gate array). One or more functions of computer program components described herein may be one or more of software-implemented, hardware-implemented, and/or software and hardware-implemented. The description of the functionality provided by the different components 108, 110, 114, and/or 116 described above is for illustrative purposes and is not intended to be limiting, as any of components 108, 110, 114, and/or 116 may provide more or less functionality than is described. For example, one or more of components 108, 110, 114, and/or 116 may be eliminated, and some or all of its functionality may be provided by other ones of components 108, 110, 114, and/or 116 and/or other components. As another example, processor(s) 104 may be configured to execute one or more additional components that may perform some or all of the functionality attributed to one of components 108, 110, 114, and/or 116.

Figure 2:
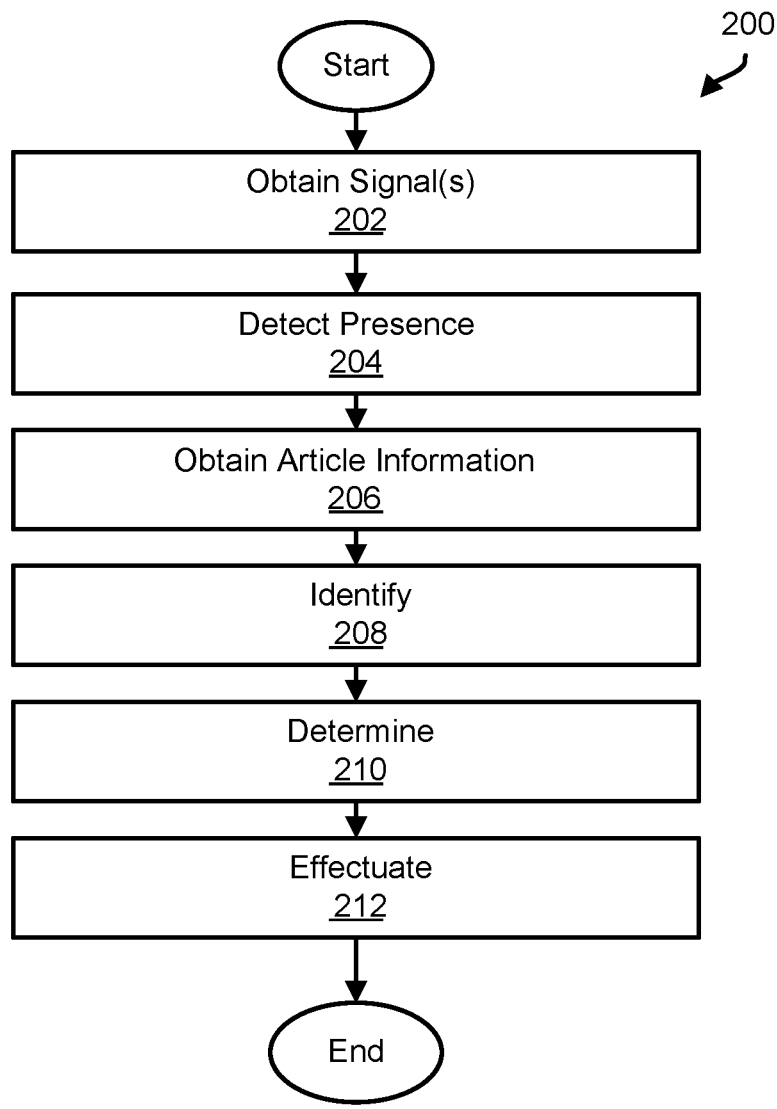
FIG. 2 illustrates a method to provide wireless communication between computing platforms and articles, in accordance with one or more implementations.

FIG. 2 illustrates a method 200 to provide wireless communication between computing platforms and articles, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in a computer system comprising one or more processing devices (e.g., a digital processor, an analog processor, a digital circuit designed to process information, an analog circuit designed to process information, a state machine, and/or other mechanisms for electronically processing information), storage media storing machine-readable instructions, one or more articles, one or more computing platforms, and/or other components. The one or more processing devices may include one or more devices executing some or all of the operations of method 200 in response to instructions stored electronically on electronic storage media. The one or more processing devices may include one or more devices configured through hardware, firmware, and/or software to be specifically designed for execution of one or more of the operations of method 200. By way of non-limiting illustration, method 200 may be implemented by a system such as system 100 (shown in FIG. 1 and described herein).

At an operation 202, wireless communication signals may be obtained. The wireless communication signals may include one or more of a first set one or more wireless communication signals, a second set of one or more wireless communication signals, and/or other signals. In some implementations, operation 202 may be performed by one or more physical processors executing a computer program component the same as or similar to communication component 108 (shown in FIG. 1 and described herein).

At an operation 204, presence of a first wearable article may be detected based on the first set of one or more wireless communication signals and/or other information. In some implementations, operation 204 may be performed by one or more physical processors executing a detection component the same as or similar to detection component 110 (shown in FIG. 1 and described herein).

At an operation 206, article information conveyed by the second set of one or more wireless communication signals may be obtained. In some implementations, operation 206 may be performed by one or more physical processors executing a communication component the same as or similar to communication component 108 (shown in FIG. 1 and described herein).

At an operation 208, customizable attributes of one or more application programs may be identified. In some implementations, operation 208 may be performed by one or more physical processors executing a customize component the same as or similar to customize component 114 (shown in FIG. 1 and described herein).

At an operation 210, custom-defined values for the customizable attributes of the one or more application programs may be determined based on the article information and/or other information. The custom-defined values may be specific to the article information and/or other information. In some implementations, operation 210 may be performed by one or more physical processors executing a customize component the same as or similar to customize component 114 (shown in FIG. 1 and described herein).

At an operation 212, the custom-defined values for the customizable attributes of one or more application programs may be effectuated such that the one or more application programs reflect the custom-defined values. In some implementations, operation 212 may be performed by one or more physical processors executing a customize component the same as or similar to customize component 114 (shown in FIG. 1 and described herein).

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system configured to provide wireless communication between computing platforms and wearable articles of clothing, the system comprising:
   a first wearable article of clothing associated with a user, the first wearable article of clothing including a first transceiver and a first non-transitory electronic storage, the first transceiver being configured to transmit and/or receive wireless communication signals, the first non-transitory electronic storage storing article information, the article information identifying the first wearable article of clothing based on a characterization of content portrayed on the first wearable article of clothing; and
   one or more physical processors configured by machine-readable instructions to:
      obtain a set of one or more wireless communication signals from the first wearable article of clothing and detect presence of the first wearable article of clothing based on the set of one or more wireless communication signals;
      obtain the article information;
      identify customizable attributes of one or more application programs;
      determine custom-defined values for the customizable attributes of the one or more application programs based on the article information such that the custom-defined values are specific to the article information, wherein the custom-defined values are specific to the article information by virtue of the custom-defined values being representative of the characterization of the content portrayed on the first wearable article of clothing; and
      effectuate the custom-defined values for the customizable attributes of the one or more application programs such that the one or more application programs are configured to reflect the custom-defined values.

2. The system of claim 1, wherein the custom-defined values are specific to the article information by virtue of the custom-defined values being representative of an identity of the first wearable article of clothing and/or the user.

3. The system of claim 2, wherein the custom-defined values are representative of the identity of the first wearable article of clothing and/or the user based on the custom-defined values specifically referring to the identity of the first wearable article of clothing and/or the user.

4. The system of claim 3, wherein the one or more application programs reflect the custom-defined values by including visual depictions of the identity of the first wearable article of clothing and/or the user.

5. The system of claim 1, wherein the customizable attributes include display attributes, audio attributes, and function attributes, the display attributes reflecting display characteristics of the one or more application programs, the audio attributes reflecting audio characteristics of the one or more application programs, and the function attributes reflecting functionality of the one or more application programs.

6. The system of claim 1, wherein the first wearable article of clothing further includes one or more sensors configured to generate output signals conveying sensor information, the one or more sensors including one or more of a motion sensor, orientation sensor, pressure sensor, a temperature sensor, a light sensor, a moisture sensor, or a heart rate sensor.

7. The system of claim 6, wherein the one or more physical processors are further configured by the machine-readable instructions to:
   obtain the sensor information; and
   determine one or more of the custom-defined values for the customizable attributes based on the sensor information such that the one or more of the custom-defined values are specific to the sensor information.

8. The system of claim 1, further comprising:
   a second article, the second article including a second transceiver and a second non-transitory electronic storage, the second transceiver being configured to transmit and/or receive second wireless communication signals, the second non-transitory electronic storage storing second article information, the second article information identifying the second article; and
   wherein the one or more physical processors are further configured by the machine-readable instructions to:
      receive a second set of one or more wireless communication signals from the second article and detect presence of the second article based on the second set of one or more wireless communication signals;
      obtain the second article information;
      determine one or more of the custom-defined values for the customizable attributes of the one or more application programs based on the second article information such that the one or more of the custom-defined values are specific to the article information and the second article information;
      effectuate the one or more of the custom-defined values for the customizable attributes of the one or more application programs.

9. The system of claim 1, wherein the one or more application programs include:
   a display application that dictates display configurations of a computing platform,
   a messaging application that facilitates communication of messages to and/or from the computing platform, and
   a gaming application that facilitates gameplay within one or more game spaces.

10. The system of claim 9, wherein a customizable attribute of the messaging application includes a keyboard attribute for a keyboard of the messaging application, and a custom-defined value of the keyboard attribute configures the keyboard to be representative of the characterization of the content portrayed on the first wearable article of clothing.

11. The method of claim 1, wherein the customizable attributes include display attributes, audio attributes, and function attributes, the display attributes reflecting display characteristics of the one or more application programs, the audio attributes reflecting audio characteristics of the one or more application programs, and the function attributes reflecting functionality of the one or more application programs.

12. A method to provide wireless communication between computing platforms and wearable articles of clothing, the wearable articles including a first wearable article of clothing associated with a user, the first wearable article of clothing including a first transceiver and a first non-transitory electronic storage, the first transceiver being configured to transmit and/or receive wireless communication signals, the first non-transitory electronic storage storing article information, the article information identifying the first wearable article of clothing based on a characterization of content portrayed on the first wearable article of clothing, the method comprising:
   obtaining a set of one or more wireless communication signals from the first wearable article of clothing and detecting presence of the first wearable article of clothing based on the set of one or more wireless communication signals;
   obtaining the article information;
   identifying customizable attributes of one or more application programs;
   determining custom-defined values for the customizable attributes of the one or more application programs based on the article information such that the custom-defined values are specific to the article information, wherein the custom-defined values are specific to the article information by virtue of the custom-defined values being representative of the characterization of the content portrayed on the first wearable article of clothing; and
   effectuating the custom-defined values for the customizable attributes of the one or more application programs such that the one or more application programs are configured to reflect the custom-defined values.

13. The method of claim 12, wherein the custom-defined values are specific to the article information by virtue of the custom-defined values being representative of an identity of the first wearable article of clothing and/or the user.

14. The method of claim 13, wherein the custom-defined values are representative of the identity of the first wearable article of clothing and/or the user based on the custom-defined values specifically referring to the identity of the first wearable article of clothing and/or the user.

15. The method of claim 14, wherein the one or more application programs reflect the custom-defined values by including visual depictions of the identity of the first wearable article of clothing and/or the user.

16. The method of claim 12, wherein the first wearable article of clothing further includes one or more sensors configured to generate output signals conveying sensor information, the one or more sensors including one or more of a motion sensor, orientation sensor, pressure sensor, a temperature sensor, a light sensor, a moisture sensor, or a heart rate sensor.

17. The method of claim 16, further comprising:
   obtaining the sensor information; and
   determining one or more of the custom-defined values for the customizable attributes based on the sensor information such that the one or more of the custom-defined values are specific to the sensor information.

18. The method of claim 12, wherein the wearable articles further comprise a second article, the second article including a second transceiver and a second non-transitory electronic storage, the second transceiver being configured to transmit and/or receive second wireless communication signals, the second non-transitory electronic storage storing second article information, the second article information identifying the second article, and the method further comprises:
   obtaining a second set of one or more wireless communication signals from the second article and detecting the presence of the second article based on the second set of one or more wireless communication signals;
   obtaining the second article information;
   determining one or more of the custom-defined values for the customizable attributes of the one or more application programs based on the second article information such that the one or more of the custom-defined values are specific to the article information and the second article information;
   effectuating the one or more of the custom-defined values for the customizable attributes of the one or more application programs.

19. The method of claim 12, wherein the one or more application programs include:
   a display application that dictates display configurations of a computing platform,
   a messaging application that dictates display configurations of messages to and/or from the computing platform, and
   a gaming application that facilitates gameplay within one or more game spaces.

20. The method of claim 19, wherein a customizable attribute of the messaging application includes a keyboard attribute for a keyboard of the messaging application, and a custom-defined value of the keyboard attribute configures the keyboard to be representative of the characterization of the content portrayed on the first wearable article of clothing.

* * * * *